(12) United States Patent
Hunter et al.

(10) Patent No.: US 7,624,131 B2
(45) Date of Patent: Nov. 24, 2009

(54) TYPE RESTRICTION AND MAPPING FOR PARTIAL MATERIALIZATION

(75) Inventors: Jason Hunter, Redmond, WA (US); David John Nettleton, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 227 days.

(21) Appl. No.: 11/654,811

(22) Filed: Jan. 18, 2007

(65) Prior Publication Data

US 2008/0178166 A1 Jul. 24, 2008

(51) Int. Cl.
*G06F 17/30* (2006.01)
*G06F 17/00* (2006.01)

(52) U.S. Cl. .............. 707/203; 707/101; 707/102; 707/103 Y; 717/165

(58) Field of Classification Search .................. None
See application file for complete search history.

(56) References Cited

U.S. PATENT DOCUMENTS

| 5,920,725 | A | * | 7/1999 | Ma et al. ............. 717/171 |
| 5,946,701 | A | | 8/1999 | Hamada |
| 6,067,575 | A | | 5/2000 | McManis et al. |
| 6,256,626 | B1 | | 7/2001 | Dong et al. |
| 6,505,211 | B1 | * | 1/2003 | Dessloch et al. ......... 707/103 Y |
| 6,671,687 | B1 | | 12/2003 | Pederson et al. |
| 6,772,410 | B1 | | 8/2004 | Komatsu et al. |
| 7,080,363 | B2 | | 7/2006 | Yellin et al. |
| 7,120,572 | B1 | | 10/2006 | Liang |
| 2002/0169786 | A1 | | 11/2002 | Richek |
| 2004/0187100 | A1 | | 9/2004 | Thiruvillamalai |
| 2006/0031233 | A1 | | 2/2006 | Liu et al. |

OTHER PUBLICATIONS

Kniesel Gunter, "Type-Safe Delegation for Run-Time Component Adaptation", http://javalab.cs.uni-bonn.de/data2/papers/darwin/dca.ecoop99-revised.pdf.
Novak Gordon S., "Creation of Views for Reuse of Software with Different Data Representations", Date: Aug. 1, 1997, http://www.cs.utexas.edu/users/novak/tose95.pdf.
Taha Walid, "A Gentle Introduction to Multi-stage Programming", http://www.cs.rice.edu/~taha/publications/journal/dspg04a.pdf.

* cited by examiner

*Primary Examiner*—Greta L Robinson
*Assistant Examiner*—James J Wilcox (57) ABSTRACT

Described is a collection of type versions (objects) associated with an application program that lists only those type versions that can be bound to an application program. This ensures stability and security by preventing other type versions from being bound to the application program, unless overridden by policy. A type binding process only materializes objects for stored types that correspond to matching type versions in the application's known types collection. The type may be loaded from a local folder, or from a global cache, providing installation flexibility. A data container accessible to the application may be populated with data for fields defined on a type in the collection having a version not bound to the application program, and for fields of a related type not maintained in the collection. Default values are used to populate any unpopulated fields when policy specifies that a different type version be used.

20 Claims, 6 Drawing Sheets

TYPE RESTRICTION AND MAPPING FOR PARTIAL MATERIALIZATION

BACKGROUND

Application programs and the objects (or types) accessed by them often evolve separately. For example, new versions of applications are developed, as are new types and extensions to existing types (also referred to as fragments). There may be very large numbers of types and extensions persisted for use in a given type system, along with many applications and versions thereof that can access those types. Further, the entities that develop types are often independent of those entities that administer their usage with applications. As a result, various potential problems arise.

One set of problems relates to installation of new types. For example, a user may want a new application installed but may not have the privileges needed to install the new type into a shared client space where types are maintained. If given such installation privileges, the user would cause other users including those with higher privileges to run the type, which is not an acceptable model. Alternatively, an administrator may want a new type installed for shared use by applications.

Another set of problems relates to stability. For example, a new type (or extension) may be developed that has its own bug set, causing an existing application to become unstable if the new type is used. Alternatively, a type may contain a bug that an application actually relies on; if the bug is fixed in a new type, using the new type may cause the application program to be unstable. In general, an application that was thoroughly vendor-tested with one type is not similarly tested as new types (and/or extensions) are developed to replace (or extend) other types.

Another set of problems relates to security. A new type or extension may introduce a security vulnerability that previously did not exist. Conversely, a new type may, for example, fix a security flaw, and thus its use is desirable, whereby policy should be able to make its use mandatory. However, enforcing one type over another ties into the set of problems related to installation.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards evaluating specifically identified types, including version information that is maintained in a collection associated with an application program, against metadata of a particular type instance that is accessible to that application program. The type instance is materialized as an object bound to the application program only when the identified type including the version information maintained in the collection matches the metadata. When instantiated, the fields of the object are populated with data for fields defined in the type instance; a data container accessible to the application may be populated with data for fields defined on a type in the collection having a version beyond that bound to the application program, and for fields of a related object corresponding to a type not maintained in the collection, but which subtypes one that does.

Policy may override an identified type in the collection, resulting in materializing a different type version as the object bound to the application program. Fields of the object are populated with data for fields defined in the particular type instance specified, with default values used to populate fields that are defined in the different type version but are not defined in the particular type instance.

In one implementation, a type binding process is coupled to one or more data stores and to an application program that is associated with a collection of known type versions. The binding process materializes objects corresponding to persisted type instance in the data store, but only materializes objects that correspond to matching type versions provided in the collection of known types, except when overridden by policy. The type version may be loaded from a local folder, or from a global cache, providing various installation options.

In one implementation, the type may be identified by a type identifier, which resolves to a type name, a schema identifier and a base type identifier. In turn, the schema identifier resolves to a schema name and version number. If an exact match does not exist for a type identifier, the collection may be evaluated for another version of the identified type that does match. If still no match is found, the object hierarchy is walked up until a type maintained in the collection that does match information in the metadata is found.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Type Restriction and Mapping For Partial Materialization

Various aspects of the technology described herein are generally directed towards a mechanism for binding code to types, including materializing type instances into objects in client applications. To this end, a model referred to as the KnownTypes model provides a map stored and maintained per domain of execution that associates each schematized type with a single type at a specific version. When objects are materialized, the map is used to determine exactly which assemblies to load, which data should be materialized, and which data should be treated otherwise (as described below).

Although one implementation exemplified herein generally describes a dynamically typed storage system or object persistent systems such as, for example, Microsoft Corporation's WinFS, along with an example binding algorithm used to materialize WinFS type instances into CLR (common language runtime) objects in client applications, the concepts are not limited to any type system and/or client applications. For example, the technology described herein also applies to an alternative type system based on Microsoft Corporation's ADO.NET technology. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing in general.

Figure 1:
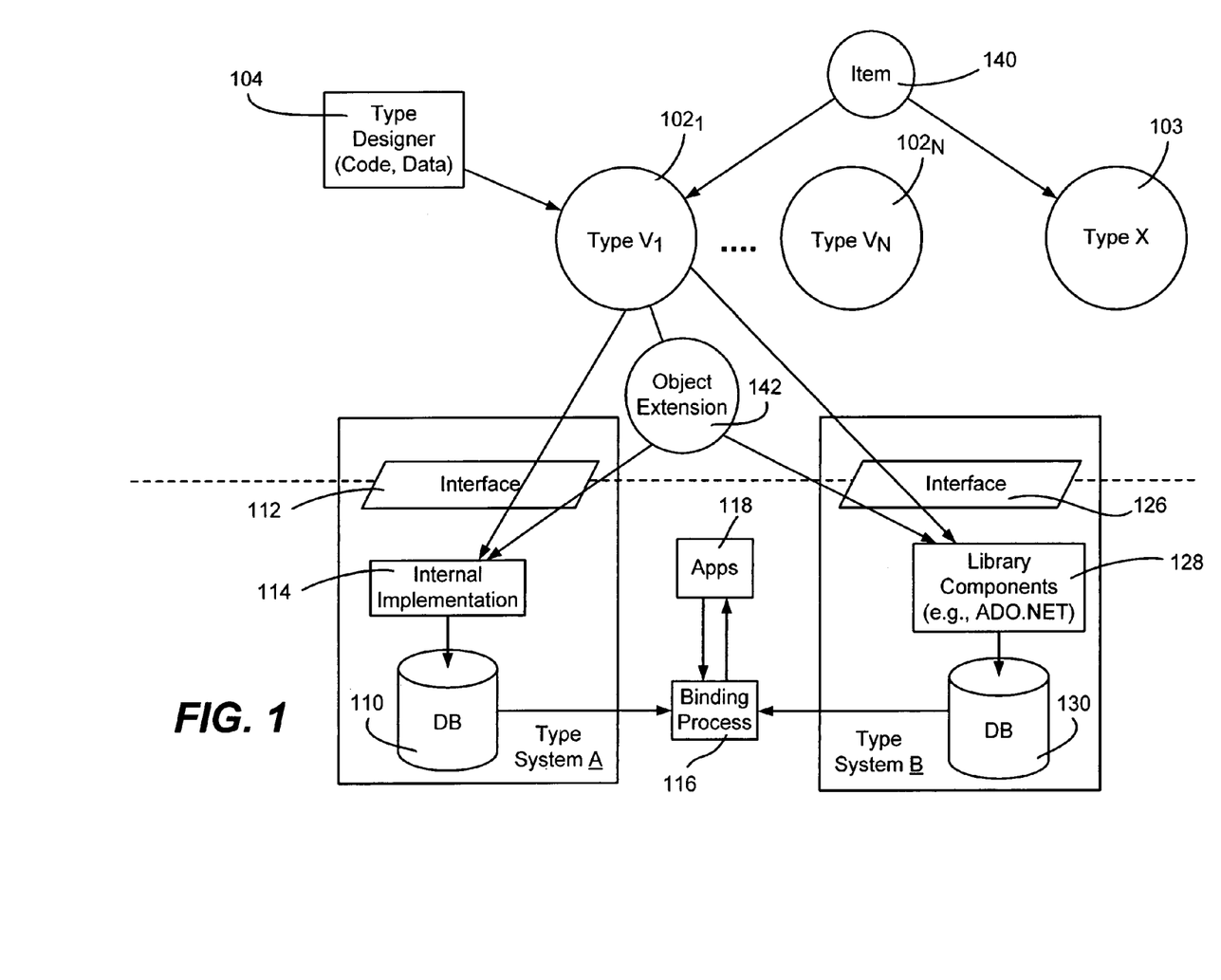
FIG. 1 shows an illustrative example environment in which type systems may provide access to types.

Turning to FIG. 1, there is shown an example implementation in which defined types $102_1$-$102_N$ and 103, created by at least one type designer (e.g., as a document 104), are persisted into a type system A. Two versions of the same type, $V_1$ and $V_N$, are shown. Note that a type system may be accessed by essentially any set of computers, such as the computers of any enterprise network, the millions of computers belonging to (mostly) unrelated computer users, and so forth.

To persist types in an example implementation, a system-accessible database 110 is used, although as can be readily appreciated other data stores and/or storage mechanisms are feasible. In general, a type designer follows a data model and schema language (e.g., creates an XML document) that describes a type's code and data 104, and follows certain guidelines of the data model and schema language, essentially a contract. Then, via an interface 112 to an internal implementation (e.g., WinFS-based) 114, an instance of the type is persisted in a serialized (non-materialized) state in the system database 110, e.g., for access by a binding process 116 (e.g., of a server) on behalf of client applications 118. In general, the binding process 116 takes a serialized, idle object and associates it with a specific set of code to run in the client process; that is, the applications 118 are written against code implementing client-side logic for a type. Once the association is formed, the code is executed for that type.

In an alternative type system B in which types may be persisted, another set of guidelines may be followed to persist types, e.g., with relaxed, more flexible rules but with certain mapping requirements. This alternative is represented in FIG. 1 via the interface 126 to library components 128 (e.g., ADO-.NET) to a database 130. Note that the binding process 116 and appropriate applications 118 for that type system B are commonly shown in FIG. 1 for purposes of simplicity, but it is understood that different processes and/or applications may correspond to each type system.

As will be understood, the technology described herein applies to these type systems A and B, as well as other alternatives.

With respect to the types, FIG. 1 also shows a common base type referred to as "Item" 140. The defined type needs to subtype the item base type 140. In FIG. 1, an extension 142 to type V1 is also shown; note that the extension is additive, and is structurally relative to its own ancestral types (not shown).

Figure 2:
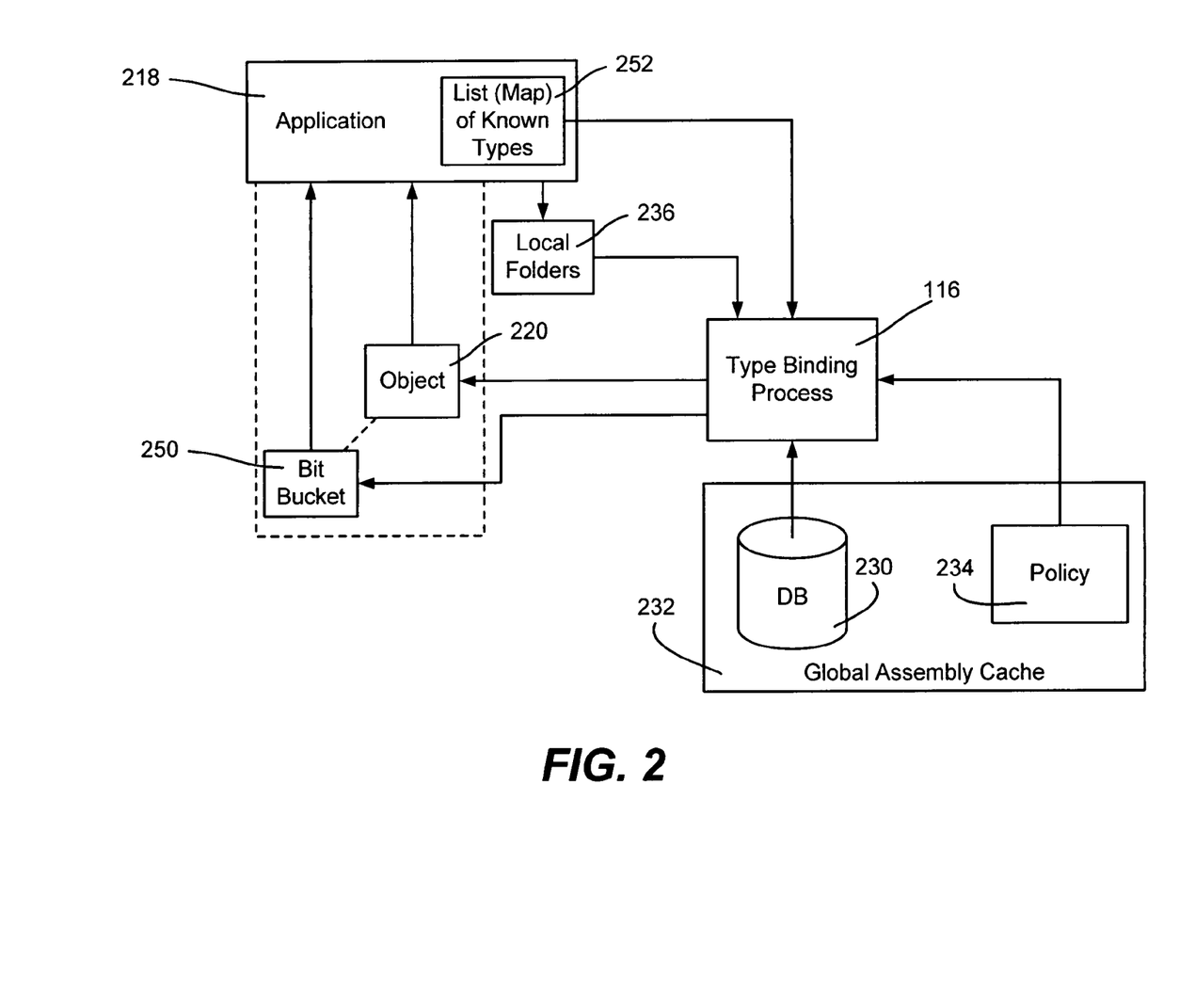
FIGS. 2 is a block diagram representing example components including a binding process used to materialize types into objects and populate objects with data.

In general, the concept of known types provides a set of principles that among other benefits, resolves problems related to type installation, type stability and type security. A first principle is that at the time of an application's development, a set of known types exist corresponding to certain versions and/or extensions. Typically the application is fully vendor-tested against this set of known types, thereby providing the highest level of security and stability guarantee. Thus, a second principle is that only those known types and versions of those known types should ever get loaded at runtime for a deployed application (although policy can override this principle, as described below). A third principle of known types is that if the system contains additional data related to that type instance, (e.g., properties from later versions or subclasses, or extensions), type materialization keeps that data around, in a container referred to as a bit bucket 250 (FIG. 2). The added data is not lost, but it is restricted from the perspective of the application (e.g., it is read only to the application); the original application can program around these restrictions in planning for future data.

FIG. 2 represents an example implementation, in which an application 218 wants to bind to at least one type instance, represented in FIG. 2 as the object 220 (where the dashed box indicates the object 220 is typically instantiated as a part of the application 218). Note that types are ordinarily maintained in assemblies, and that a type instance may correspond to many objects (including supertypes and subtypes). In general, types may be maintained in a database 230, such as in a CLR implementation in a (system-wide) shared global assembly cache 232 that also includes policy 234. As described below, in one implementation, only an administrator can store types in the global assembly cache 232. However, types also may be maintained in one or more local folders 236 (e.g., on a hard drive), including those in which lesser-privileged users can store types, and those in which an administrator can store types. As described below with reference to the flow diagram of FIGS. 3-5, based on a list of known types 252 associated with the application, the binding process 116 performs the binding in a way that resolves installation, security and stability issues.

With respect to installation, users running Least-Privileged User Accounts, sometimes called Limited User Accounts or User Access Control, need to be able to install applications that include new types. As a result, applications installed by such limited accounts have to bind installed client-side logic to such installed schemas. To this end, because each application populates its own KnownTypes collection, a limited privilege-installed application installs a schema package for its schemas into the storage system and binds its own KnownTypes collection to client-side logic shipped with the application. This binding is non-harmful because the installed logic is only in the KnownTypes collection of that application (in a local folder) and no other applications.

Also with respect to installation, shared data is a primary goal of a type storage system. For data to be shared, the client-side logic bound to types needs to be shared. To this end, administrators may install shared types that can be shared by both different users and different applications on the system. The CLR, for instance, provides the global assembly cache 232 as a mechanism and programming pattern to enable admin approved machine-wide sharing. Other implementation technologies provide similar mechanisms.

Further, limited privilege applications may wish to share types. For example, a single least privileged user may install two applications that share a common type, and/or the case where two different least privileged users each install an application which shares a common type with the other. While the KnownTypes mechanism does not directly solve the problem of where to install shared logic, it does provide for an explicit programming paradigm by which two applications that have agreed on a shared location can share logic stored there. Administrators can install client-side logic in the global assembly cache 232 if they are to be shared across applications. Applications can use any registration mechanism appropriate for deciding which global assembly cached assemblies to reference during KnownTypes population. The limited privilege-installed application adjusts its logic loading paths to include an agreed-upon shared location, and then specify the version of the logic located there in its KnownTypes collection. The population of KnownTypes in either case may be done optimistically at start up, pessimistically after enumerating the logic available at the shared locations, based on a configuration file or registry hive read by the application, or using any other mechanism devisable. In short, KnownTypes is an enabling technology for solving this problem.

With respect to security, lesser privileged user accounts cannot install "code" that gets automatically executed in other contexts, otherwise other, more privileged users may load and inadvertently execute this code. This type of elevation of privileges is a danger to the system, and needs to be prevented. To this end, in the KnownTypes binding process, no logic is ever loaded by an application unless the application explicitly opted in for that logic via KnownTypes or an administrator implemented policy enforcing the loading of that logic on the system. As such, no lesser privileged user account application can deploy logic that could be loaded automatically by a process with higher privileges. This is true even if the application were able to place the logic in the loading paths of the privileged application.

Applications that implemented a deferred KnownTypes model (as mentioned in the pessimistic enumeration above) need to take precautions to populate their KnownTypes collections only with logic deemed safe by their Add-in deployment model. The security of deferred KnownTypes is left up to the application.

With respect to stability, many applications do not want to load third party logic at runtime that was not thoroughly tested before shipping, e.g., because bugs in such third party logic leads to poor application experiences and/or misapplication of blame when the bugs surface. Furthermore, dynamically loading third party components can lead to combinations of those components that were never intended by the component authors. In such situations the components may malfunction, again exposing poor application experiences including data loss. However, some applications still need to dynamically load components and are willing and able to mitigate the complexities described above. Therefore, the system prevents automatic third party loading while enabling opt-in third party loading for those applications that are interested.

To this end, (as with security above), no logic is ever loaded by an application unless opted in via KnownTypes. The set of logic loaded in to a process (aside from system-wide policy which is controlled by administrators and is primarily intended for important bug fix deployments) is always exactly the set an application was tested with during development or logic provided by approved Add-ins.

Applications that implemented a deferred KnownTypes model need to take precautions to populate their KnownTypes collections only with logic deemed stable and which does not conflict with logic loaded via static references. The stability of deferred KnownTypes is left up to the application, however the KnownTypes implementation provides mechanism to evaluate the version compatibility of an Add-in with an existing domain of execution and provide programmable means to determine whether domain of execution recycling or isolation is advisable.

System-wide policy 234 constructed by administrators can automatically replace logic with a later available version. Critical bug fixes may require this replacement, e.g., when a security vulnerability discovered in a tested version outweighs the risk of malfunction from a fixed version. As described below, the type binding process 116 is compatible with system-wide policy deployments. More particularly, the KnownTypes binding algorithm allows deployment mechanisms or the like to roll forward assemblies during the binding process. However, it does not rely on any particular deployment of policy features for correctness. If policy 234 is removed, then the KnownTypes mechanism attempts to load those assemblies it believes are bound statically and/or adjusted by configuration.

Figure 3:
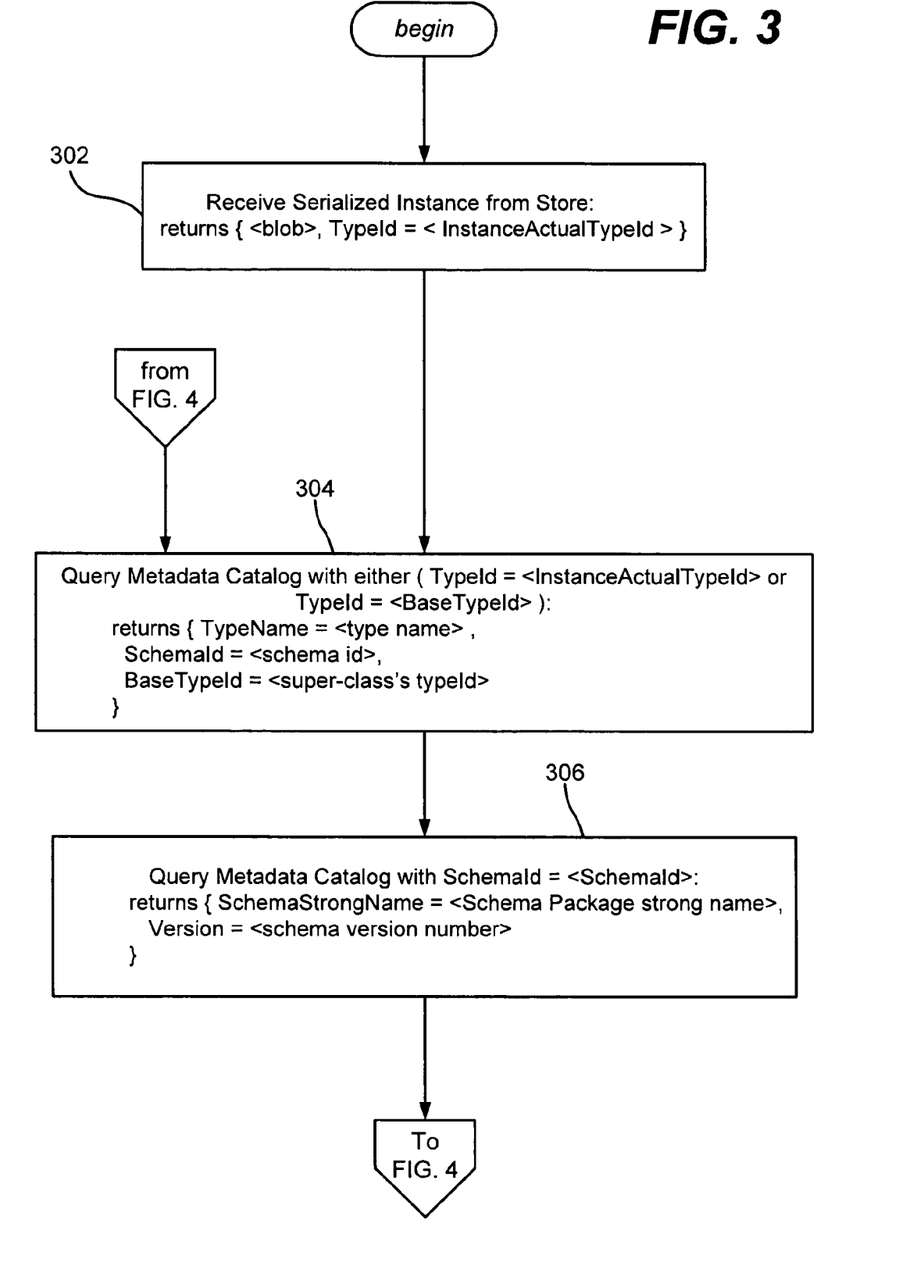
FIGS. 3-5 comprise a flow diagram showing example steps taken by a binding process to materialize types.
Figure 4:
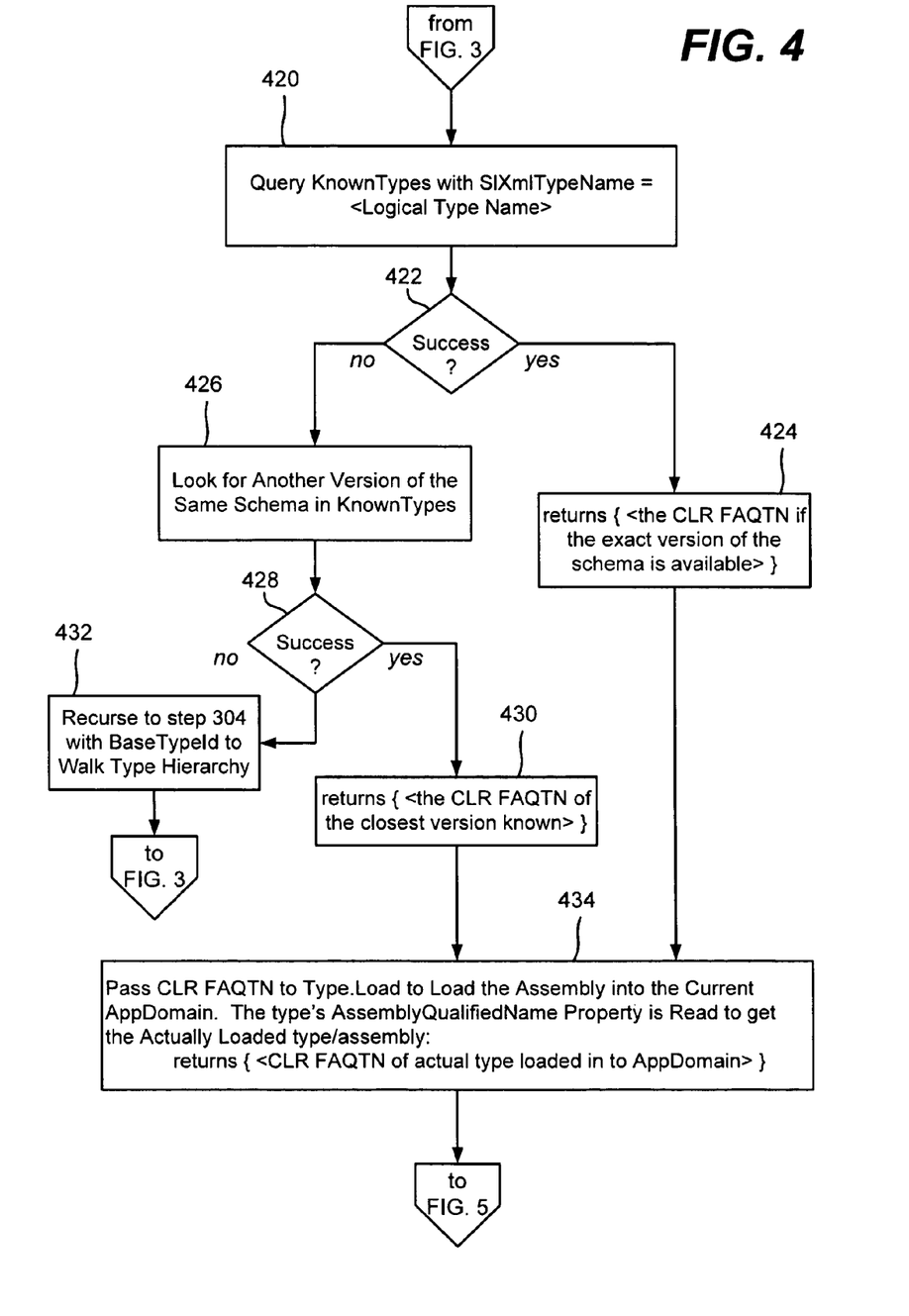
Figure 5:
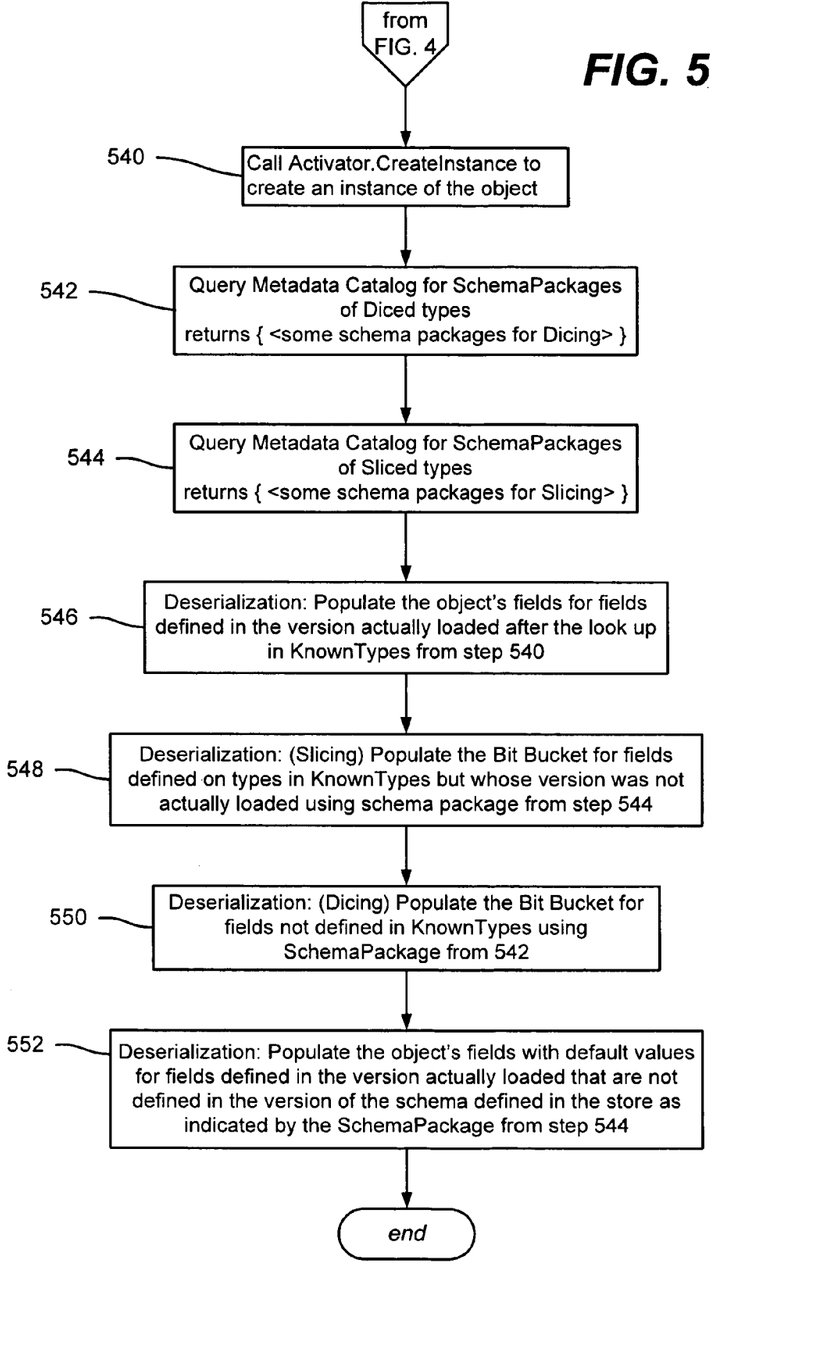

Turning to the flow diagram represented in FIGS. 3-5, the various installation, security and stability issues are resolved in the binding process 116 in which assemblies which contain code are loaded, and classes in the assembly are instantiated to create an object. Note that the list of known types contain versions of assemblies (e.g., their names and version numbers such as a strong name in a cryptographic string) written into part of the application at time of application development. As will be understood, in general the binding process will only load the code associated with those names, and will fail if that version is not available, even if a later version exists for other applications. This provides a very strong guarantee that types known at time of development will be used, as opposed to the use of types discovered at runtime.

In general, an application defines a set of types at design time and only the implementation/logic for those types is ever executed in the application regardless of which types and which versions are available in the server. In one implementation, different versions of a type may exist at different times, but the server only knows about a single version at a time, and subsequent versions are structurally additive-only evolutions of previous versions. Subtypes of existing types may be created at any time; subtypes are strictly additive structurally relative to their ancestral types and applications may be written against an ancestral type when dealing with an instance.

Instances read from the database are mapped to the subset of available types defined in the application's list of known types 252 in a best fit way with supertypes or earlier versions, partially materializing missing types when necessary. Non-materialized data is maintained in the bit bucket 250 which is discoverable and able to be inspected by the application. The bit bucket 250 is strictly read-only to applications.

As described above, the KnownTypes model provides a map 252 stored and maintained per domain of execution that associates each schematized type with a single type at a specific version. When objects (e.g., the object 220) are materialized, the map 252 is used to determine which assemblies are loaded and which data is placed in the bit bucket 250.

The KnownTypes collection is used during client-side materialization to decide which type to instantiate. Step 302 of FIG. 3 represents a serialized instance received from a data store, which returns certain data, namely {<blob>, TypeId=<InstanceActualTypeId>}. More particularly, when the application accesses the database, the application gets back a blob that includes the type and version; (note that the "object" is typically made up of possibly many other objects, but only one is discussed herein for purposes of simplicity).

Step 304 represents using the information received at step 302 to query the database's metadata (e.g., in a catalog) with the type ID unique for the system. In this example implementation, the query is made to resolve the ID to more specific information, namely the text strong name of the class associated with the type, the schema ID (corresponding to a name) of the assembly in which that class appeared, and the base type ID, which points to the supertype from which this class was derived. In the example of step 304, the metadata catalog is queried with either ( TypeId =<InstanceActualTypeId>) (or if a recursive query as described below, with TypeId=<BaseTypeId>)), which returns {TypeName=<type name>, SchemaId=<schema id>, and BaseTypeId=<superclass's typeId>}.

Step 306 then resolves the schema ID to the textual name of assembly and its version number, e.g., the metadata catalog is queried with SchemaId=<SchemaId>, which returns {SchemaStrongName=<Schema Package strong name>. An example may be: xxx:///Workplace,f45b95b0f79f4fbe, 1.0.1.

The process then continues to step 420 of FIG. 4 where the known types information (in the list of types 252) is queried, to map the logical names of types obtained during the query process to physical, acceptable assemblies that can be run with executable code for those types. For example, the KnownTypes may be queried with SlXmlTypeName=<Logical Type Name>, such as SlXmlTypeName=<Employee, xxx:///Workplace, f45b95b0f79f4fbe, 1.0.1>.

In general, given the name of the type, the assembly and version number, step 422 evaluates via KnownTypes whether this specific version is acceptable to load. If so, step 422 is successful, and the CLR Full Assembly-Qualified Type Name (FAQTN) is returned, that is, when the exact version of the schema was available, and the process continues to step 434.

If not successful, then step 426 looks for another version of the same schema in KnownTypes, e.g., SlXmlTypeName=<Employee, xxx:///Workplace, f45b95b0f79f4fbe, *>. If this other lookup is successful (step 428), at step 430 the query returns the CLR FAQTN of the closest version known, and the process continues to step 434.

If steps 426 and 428 fail to find another version, then the process returns to step 304 of FIG. 3 using the BaseTypeId previously discovered. In general, this recursion walks the type hierarchy until an acceptable type is found; note that all types are below Item, and thus at the very least the Item type will be found, and step 434 will eventually be performed.

Step 434 loads the exact code found via step 424 or step 430, (although as described below this may be overridden by policy). Note that step 434 will fail if the needed code one is not found in any place that it may be persisted, e.g., the global assembly cache 232, or a local folder 236 such as an administrator controlled directory or lesser-privileged user account directory.

Global policy 234 (FIG. 2) may apply to override the specific version located. More particularly as described above, a critical bug fix or the like may require that a version other than that specifically specified by an application be enforced. Step 434 consults policy and returns the substituted version for any type that is overridden by policy. The application may be notified of the policy-caused substitution, and can accept the substitution or choose not to run. For purposes of the present example, the loading is acceptable to the application, and process continues to step 540 of FIG. 5.

Step 540 creates an instance of the loaded object. In this example, this is accomplished via a call to Activator.CreateInstance. At this time, the object is ready to be populated with data.

However, if the KnownTypes collection is populated by the client application, a serialized form may contain a type instance for a type that is unknown (i.e. not in the KnownTypes collection). This situation can occur if there are subtypes of a known type that has been saved in the store. For instance, continuing the above example, imagine that some type "Employee" derived from "Contact" exists in a schema called "Workplace" that is defined in the store. An appropriate entry thus may not appear in the KnownTypes collection.

Thus, as presented via steps 542 and 550, a subprocess referred to as "dicing" occurs whenever a type referenced in a serialized instance is not available in the KnownTypes collection, because the client-side assembly needed to materialize that type is unknown. Note that even if the client-side type's name was known and the assembly was actually available it is not known whether it is safe to load that assembly. As such, the Employee instance in the above example is materialized as a Contact and the Employee properties are diced off and placed in the object's bit bucket 250.

Note that a client-side assembly implementing a particular type being in the KnownTypes collection is not directly related to whether that assembly is available or not. In the example above, the Workplace client-side assembly may be available by being located in the current application's path or being installed in the global assembly cache 232. Regardless of its availability, this assembly will never be loaded and used because its types have not been explicitly placed in the KnownTypes collection.

Another aspect relates to missing versions. For example, if the KnownTypes collection is populated by the client application, a serialized form may contain a type instance for a version of a type that is unknown. This situation can occur if a schema has been upgraded to a later version in the store, but not in the client. Again, an appropriate entry does not appear in the KnownTypes collection.

A subprocess referred to as slicing, represented in FIG. 5 via steps 544 and 548 occurs whenever a version of a type referenced in a serialized instance is not available in the KnownTypes collection and is not discovered automatically by policy. Note that, as with dicing, a client-side assembly implementing a particular version of a type being in the KnownTypes collection is not directly related to whether that assembly is available. A later version of a type referenced by a serialized instance may be available in the global assembly cache, but no policy is present that forces its loading. Regardless of its availability, this assembly will never be loaded and used. Further note that the global assembly cache can store multiple versions of a single assembly simultaneously and does not require that all references to the earlier version be satisfied with the later version. This roll-forward policy is implemented separately with policy, and if absent the global assembly cache will satisfy requests for each version with the appropriate assembly version.

Alternatively, unlike dicing, note that inclusion in the KnownTypes collection is insufficient to force a particular version of an assembly to load. For security reasons, in one implementation, policy will always override the KnownTypes collection. Object materialization takes this situation into account when populating properties to ensure that reflection over an instantiated type does not adversely impact the expected consistent state of the type that is actually instantiated. This includes the four possible responses, namely that the version of the assembly loaded is equal to the version requested, greater than the version requested but less than the version referenced by the serialized instance, equal to the version referenced which is greater than the version requested, and greater than the version referenced which is greater than the version requested.

Thus, steps 542 and 544 determine whether such additional data exists, e.g., because recursion was used with respect to an earlier version or a supertype. Steps 542 and 544 obtain such structural information, whereby the process knows what data to materialize and what not to materialize.

Steps 546, 548 550 and 552 represent the materialization, including copying the materialized data part into the object (step 546) to populate the object's fields for fields defined in the version actually loaded after the look up in KnownTypes. Step 548 represents slicing, namely copying the data of derived types to populate the bit bucket for fields defined on types in KnownTypes but whose version was not actually loaded using the schema package from step 544. Step 550 represents dicing, namely copying data from unknown subtypes to populate the bit bucket for fields not defined in KnownTypes using the SchemaPackage from step 542.

Further, because policy may have changed the object version to include properties/fields that were not known at application dev time, step 552 populates the object with default data in this situation. In other words, any values that need to be loaded because of system policy are assigned to the object instance so that the object is complete.

Exemplary Operating Environment

Figure 6:
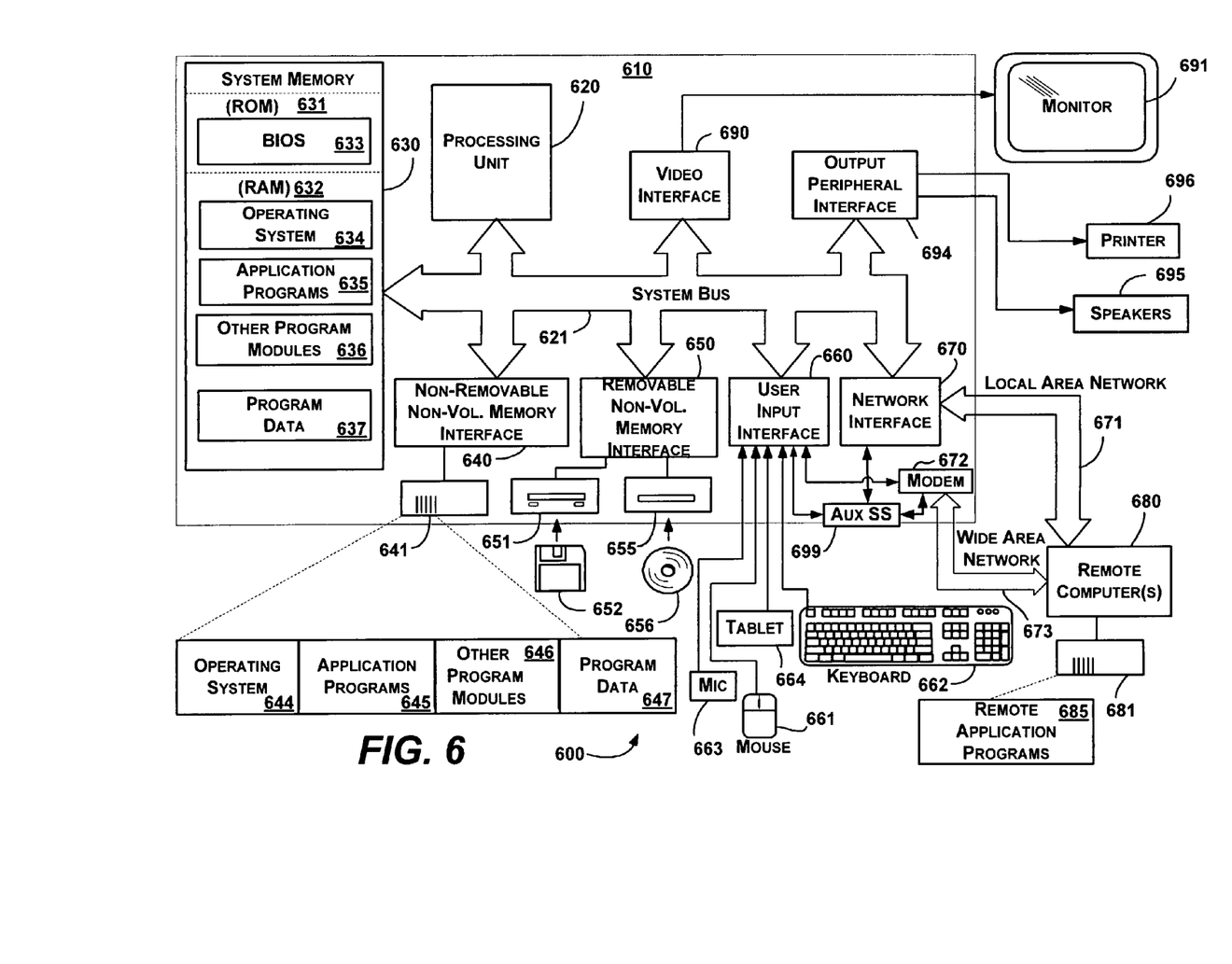
FIG. 6 is a block diagram representing an example computing environment into which example components may be implemented.

FIG. 6 illustrates an example of a suitable computing system environment 600 on which the application program 218 (FIG. 2) and/or type binding process 116 (FIG. 2) may be implemented. The computing system environment 600 is only one example of a suitable computing environment and is not intended to suggest any limitation as to the scope of use or functionality of the invention. Neither should the computing environment 600 be interpreted as having any dependency or requirement relating to any one or combination of components illustrated in the exemplary operating environment 600.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 6, an exemplary system for implementing various aspects of the invention may include a general purpose computing device in the form of a computer 610. Components of the computer 610 may include, but are not limited to, a processing unit 620, a system memory 630, and a system bus 621 that couples various system components including the system memory to the processing unit 620. The system bus 621 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 610 typically includes a variety of computer-readable media. Computer-readable media can be any available media that can be accessed by the computer 610 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 610. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 630 includes computer storage media in the form of volatile and/or nonvolatile memory such as read only memory (ROM) 631 and random access memory (RAM) 632. A basic input/output system 633 (BIOS), containing the basic routines that help to transfer information between elements within computer 610, such as during start-up, is typically stored in ROM 631. RAM 632 typically contains data and/or program modules that are immediately accessible to and/or presently being operated on by processing unit 620. By way of example, and not limitation, FIG. 6 illustrates operating system 634, application programs 635, other program modules 636 and program data 637.

The computer 610 may also include other removable/non-removable, volatile/nonvolatile computer storage media. By way of example only, FIG. 6 illustrates a hard disk drive 641 that reads from or writes to non-removable, nonvolatile magnetic media, a magnetic disk drive 651 that reads from or writes to a removable, nonvolatile magnetic disk 652, and an optical disk drive 655 that reads from or writes to a removable, nonvolatile optical disk 656 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 641 is typically connected to the system bus 621 through a non-removable memory interface such as interface 640, and magnetic disk drive 651 and optical disk drive 655 are typically connected to the system bus 621 by a removable memory interface, such as interface 650.

The drives and their associated computer storage media, described above and illustrated in FIG. 6, provide storage of computer-readable instructions, data structures, program modules and other data for the computer 610. In FIG. 6, for example, hard disk drive 641 is illustrated as storing operating system 644, application programs 645, other program modules 646 and program data 647. Note that these components can either be the same as or different from operating system 634, application programs 635, other program modules 636, and program data 637. Operating system 644, application programs 645, other program modules 646, and program data 647 are given different numbers herein to illustrate that, at a minimum, they are different copies. A user may enter commands and information into the computer 610 through input devices such as a tablet, or electronic digitizer, 664, a microphone 663, a keyboard 662 and pointing device 661, commonly referred to as mouse, trackball or touch pad. Other input devices not shown in FIG. 6 may include a joystick, game pad, satellite dish, scanner, or the like. These and other input devices are often connected to the processing unit 620 through a user input interface 660 that is coupled to the system bus, but may be connected by other interface and bus structures, such as a parallel port, game port or a universal serial bus (USB). A monitor 691 or other type of display device is also connected to the system bus 621 via an interface, such as a video interface 690. The monitor 691 may also be integrated with a touch-screen panel or the like. Note that the monitor and/or touch screen panel can be physically coupled to a housing in which the computing device 610 is incorporated, such as in a tablet-type personal computer. In addition, computers such as the computing device 610 may also include other peripheral output devices such as speakers 695 and printer 696, which may be connected through an output peripheral interface 694 or the like.

The computer 610 may operate in a networked environment using logical connections to one or more remote computers, such as a remote computer 680. The remote computer 680 may be a personal computer, a server, a router, a network PC, a peer device or other common network node, and typically includes many or all of the elements described above relative to the computer 610, although only a memory storage device 681 has been illustrated in FIG. 6. The logical connections depicted in FIG. 6 include one or more local area networks (LAN) 671 and one or more wide area networks (WAN) 673, but may also include other networks. Such networking environments are commonplace in offices, enterprise-wide computer networks, intranets and the Internet.

When used in a LAN networking environment, the computer 610 is connected to the LAN 671 through a network interface (e.g., adapter) 670. When used in a WAN networking environment, the computer 610 typically includes a modem 672 or other means for establishing communications over the WAN 673, such as the Internet. The modem 672, which may be internal or external, may be connected to the system bus 621 via the user input interface 660 or other appropriate mechanism. A wireless networking component such as comprising an interface and antenna may be coupled through a suitable device such as an access point or peer computer to a WAN or LAN. In a networked environment, program modules depicted relative to the computer 610, or portions thereof, may be stored in the remote memory storage device. By way of example, and not limitation, FIG. 6 illustrates remote application programs 685 as residing on memory device 681. It may be appreciated that the network connections shown are exemplary and other means of establishing a communications link between the computers may be used.

An auxiliary subsystem 699 (e.g., for auxiliary display of content) may be connected via the user interface 660 to allow data such as program content, system status and event notifications to be provided to the user, even if the main portions of the computer system are in a low power state. The auxiliary subsystem 699 may be connected to the modem 672 and/or network interface 670 to allow communication between these systems while the main processing unit 620 is in a low power state.

CONCLUSION

Thus, as set forth above, a data model and schema language define a type system and its associated storage such that types can be introduced at any time. Multiple applications can be implemented against these types utilizing different subsets of those types known to the system. Because the large numbers of types and the large numbers of applications evolve independently, and no single administrator exists to decide on which types should interact with which applications, complex interaction possibilities are present. As such, installation problems, security problems, stability problems and so forth exist, which are resolved by a binding process as exemplified above.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A computer-readable storage medium having computer-executable instructions that, when executed, cause a computer to perform a computer-implemented method comprising:
    binding an application program to a collection populated with a set of known types including version information against which the application program has been tested;
    determining whether to restrict materialization of a particular type instance persisted in a serialized state within a data store by evaluating the set of known types including version information that is maintained in the collection associated with the application program against metadata of the particular type instance that is accessible to the application program;
    materializing the type instance as an object bound to the application program only when the identified type including the version information maintained in the collection matches the metadata;
    restricting the materialization of the particular type instance when the identified type including the version information maintained in the collection does not match the metadata; and
    maintaining non-materialized data for a restricted type instance in a data container comprising a bit bucket that is read-only to the application program.

2. The computer-readable storage medium of claim 1 wherein materializing the type version comprises instantiating the object and populating fields of the object with data for fields defined in the type instance.

3. The computer-readable storage medium of claim 2 having further computer-executable instructions for populating a data container for fields defined on a type in the collection having a version not bound to the application program.

4. The computer-readable storage medium of claim 2 having further computer-executable instructions for populating a data container for fields of a related object corresponding to a type not maintained in the collection.

5. The computer-readable storage medium of claim 1 having further computer-executable instructions for determining that policy overrides the identified type, and materializing a different type version as the object bound to the application program as set forth in the policy.

6. The computer-readable storage medium of claim 5 wherein materializing the different type version comprises instantiating the object, populating fields of the object with data for fields defined in the particular type version, and populating fields that are defined in the different type version but are not defined in the particular type instance with default values.

7. The computer-readable storage medium of claim 1 wherein the identified type including version information comprises a type identifier, and having further computer-executable instructions comprising, querying to resolve the type identifier to a type name, a schema identifier and a base type identifier.

8. The computer-readable storage medium of claim 7 having further computer-executable instructions for querying to resolve the schema identifier to a schema name and version number.

9. The computer-readable storage medium of claim 1 having further computer-executable instructions for determining that the identified type including the version information maintained in the collection does not match the metadata, and looking in the collection for another version of the identified type that does match information in the metadata.

10. The computer-readable storage medium of claim 1 having further computer-executable instructions for determining that the identified type including the version information maintained in the collection does not match the metadata, and walking up a type hierarchy corresponding to the object to look for a type maintained in the collection that does match information in the metadata.

11. The computer-readable storage medium of claim 1 wherein materializing the type version comprises at least one of loading the type version from a local folder or loading the type version from a global cache.

12. In a computing environment, a system comprising:
at least one data store on a computer, each data store containing a set of type instances persisted in a serialized state; and
a type binding process coupled to each data store and to an application program on the computer that is bound to a collection populated with a set of known type versions against which the application program has been tested, the binding process configured to materialize objects corresponding to persisted type instances in the data store for binding to the application program, in which the binding process:
determines whether to restrict materialization of a particular object within the data store by evaluating the set of known type versions maintained in the collection associated with the application program against metadata corresponding to the type version of the particular object,
only materializes objects that correspond to matching type versions provided in the collection of known type versions, except when overridden by policy,
restricts materialization of objects when the type versions of the objects do not match the known type versions maintained in the collection, and
maintains non-materialized data for restricted objects in a data container comprising a bit bucket that is read-only to the application program.

13. The system of claim 12 wherein the binding process materializes the objects by:
instantiating each object and populating fields of that object with data for fields defined in the matching type version,
populating a data container for fields defined on any type in the collection having a version not bound to the application program, and
populating a data container for fields of any related object corresponding to a type not maintained in the collection.

14. The system of claim 12 wherein policy overrides at least one type identified in the collection of known types, and wherein the binding process materializes a different object for each overridden type by:
instantiating that different object,
populating fields of that different object with data for fields defined in the matching type version, and
populating fields that are defined in the different type version but are not defined in the matching type version with default values.

15. The system of claim 12 wherein each type version has an identifier corresponding to: a type name, a schema identifier corresponding to a schema name and version number, and a base type identifier.

16. In a computing environment, a method comprising:
maintaining a collection populated with a set of known type versions against which an application program has been tested;
binding the collection to the application program on a computer;
using the collection to restrict the application from materializing objects persisted in a serialized state within a data store by evaluating the set of known type versions maintained in the collection associated with the application program against metadata corresponding to type versions of the objects to ensure that no objects having type versions not maintained in the collection can be materialized as objects bound to the application program unless overridden by policy; and
maintaining non-materialized data for restricted objects in a data container comprising a bit bucket that is read-only to the application program.

17. The method of claim 16 wherein using the collection comprises evaluating type versions identified in the collection against type versions persisted in a data store, and if there is a match, instantiating an object and populating fields of that object with data for fields defined in the matching type version.

18. The method of claim 16 further comprising, populating a data container for fields defined on any type in the collection having a version not bound to the application program, and populating a data container for fields of any related object corresponding to a type not maintained in the collection.

19. The method of claim 16 wherein the policy overrides at least one type identified in the collection, and further comprising, instantiating an object identified in the policy, populating fields of the object identified in the policy with data for fields defined in the matching type version, and populating fields of the object identified in the policy but not defined in the matching type version with default values.

20. The method of claim 16 wherein a type version set forth in the collection is not found in a data store, and further comprising, looking in the collection for another version of the identified type that is available, and if found, materializing that other version, and if not found, walking up a type hierarchy corresponding to the object to look for a type in the collection that is available.

* * * * *